US008395479B2

(12) United States Patent
Sano et al.

(10) Patent No.: US 8,395,479 B2
(45) Date of Patent: Mar. 12, 2013

(54) COMMODITY MANAGEMENT APPARATUS

(75) Inventors: Kouichi Sano, Shizuoka (JP); Shinji Saegusa, Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 557 days.

(21) Appl. No.: 12/623,820

(22) Filed: Nov. 23, 2009

(65) Prior Publication Data

US 2010/0141383 A1 Jun. 10, 2010

(30) Foreign Application Priority Data

Dec. 5, 2008 (JP) ................................ 2008-311449

(51) Int. Cl.
*G05B 19/00* (2006.01)

(52) U.S. Cl. .................. 340/5.91; 340/5.92; 177/25.13; 177/25.19; 177/45; 705/28

(58) Field of Classification Search ................ 340/5.91, 340/5.92, 613, 1.1, 5.1, 5.9; 177/25.13, 25.19, 177/45; 705/28
See application file for complete search history.

(56) References Cited

U.S. PATENT DOCUMENTS

| | | | | |
|---|---|---|---|---|
| 7,225,980 | B2 * | 6/2007 | Ku et al. | 235/383 |
| 7,557,310 | B2 * | 7/2009 | Lai et al. | 177/25.13 |
| 7,623,035 | B2 * | 11/2009 | August et al. | 340/572.1 |
| 2006/0208893 | A1 * | 9/2006 | Anson et al. | 340/572.1 |
| 2007/0122035 | A1 * | 5/2007 | Lai et al. | 382/181 |
| 2008/0082360 | A1 * | 4/2008 | Bailey et al. | 705/2 |
| 2008/0157967 | A1 * | 7/2008 | Jones et al. | 340/572.1 |
| 2010/0019906 | A1 | 1/2010 | Kushida et al. | |

FOREIGN PATENT DOCUMENTS

| | | |
|---|---|---|
| JP | 2000-154673 | 6/2000 |
| JP | 3598341 | 9/2004 |
| JP | 3681823 | 5/2005 |
| JP | 2005-141388 | 6/2005 |
| JP | 2005-251209 | 9/2005 |
| JP | 2007-148723 | 6/2007 |
| JP | 2007-333499 | 12/2007 |

OTHER PUBLICATIONS

Japanese Office Action for 2008-311449 mailed on Sep. 14, 2010.

* cited by examiner

*Primary Examiner* — Brian Zimmerman
*Assistant Examiner* — Sara Samson
(74) *Attorney, Agent, or Firm* — Turocy & Watson, LLP

(57) ABSTRACT

A commodity management apparatus includes, a weighing dish on which a container having a wireless tag attached thereto is mounted, an antenna which forms a region to communicate with the wireless tag from the side part of the weighing dish to the upper part of the weighing dish, a tag reader which contactlessly reads, via the antenna, data in the wireless tag attached to the container, a weight detection unit which detects the weight of the container mounted on the weighing dish, and an output control unit which outputs the weight of the container detected by the weight detection unit and the data in the wireless tag read by the tag reader.

17 Claims, 13 Drawing Sheets

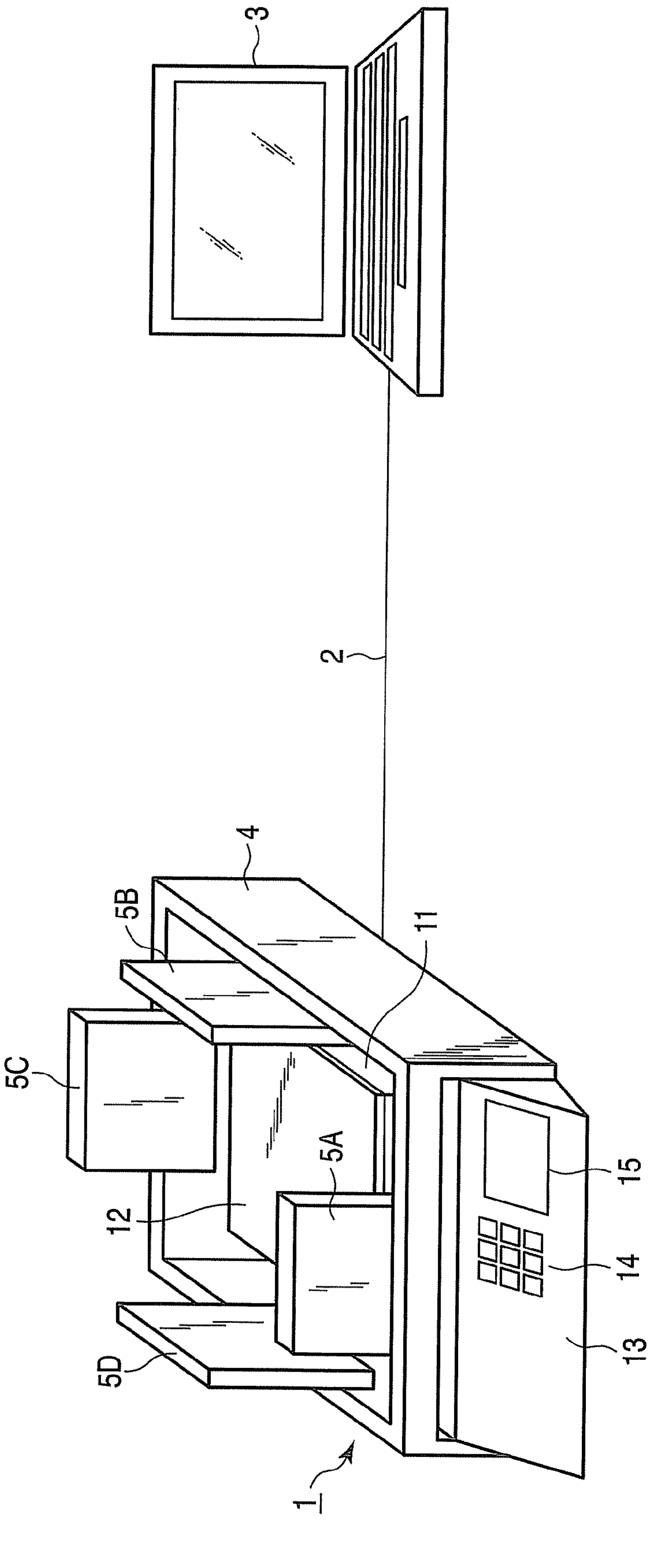
F I G. 1

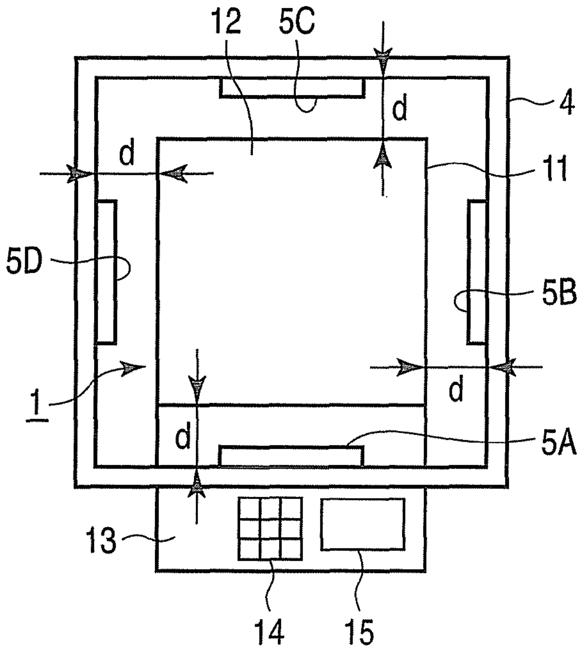
F I G. 2
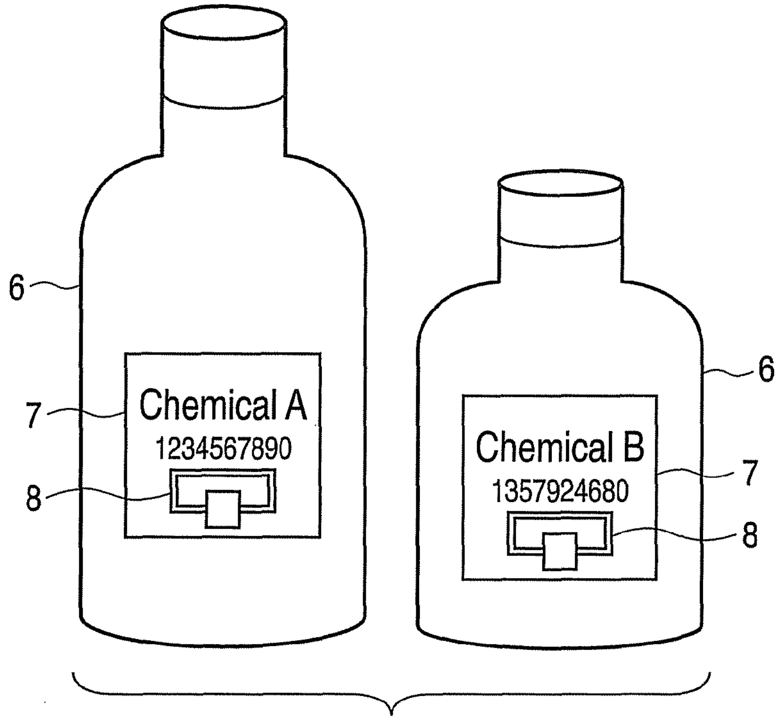
F I G. 3

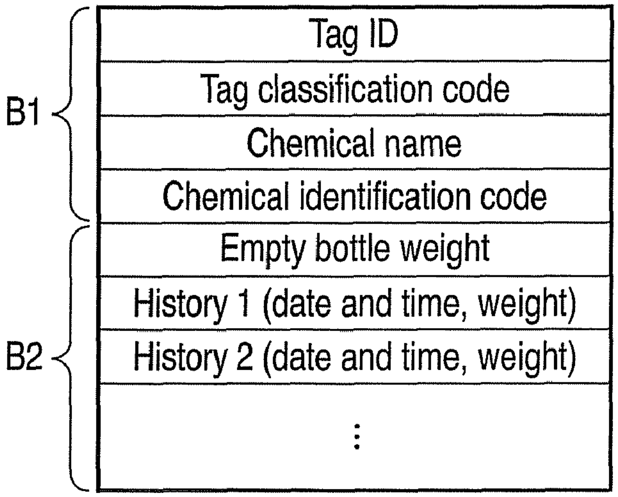
F I G. 4
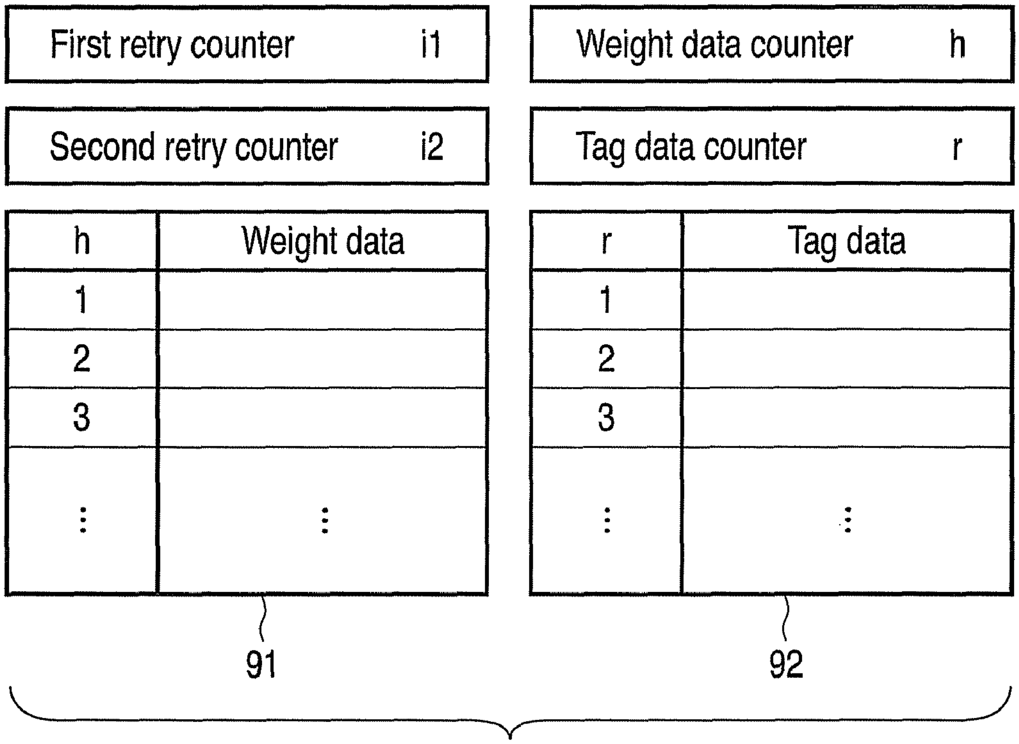
F I G. 6
|   |   |
|---|---|
| B1 | Tag ID |
|   | Tag classification code |
|   | Chemical name |
|   | Chemical identification code |
| B2 | Empty bottle weight |
|   | History 1 (date and time, weight) |
|   | History 2 (date and time, weight) |
|   | ⋮ |
| First retry counter | i1 |
|---|---|
| Second retry counter | i2 |
| h | Weight data |
|---|---|
| 1 |   |
| 2 |   |
| 3 |   |
| ⋮ | ⋮ |
91
| Weight data counter | h |
|---|---|
| Tag data counter | r |
| r | Tag data |
|---|---|
| 1 |   |
| 2 |   |
| 3 |   |
| ⋮ | ⋮ |
92

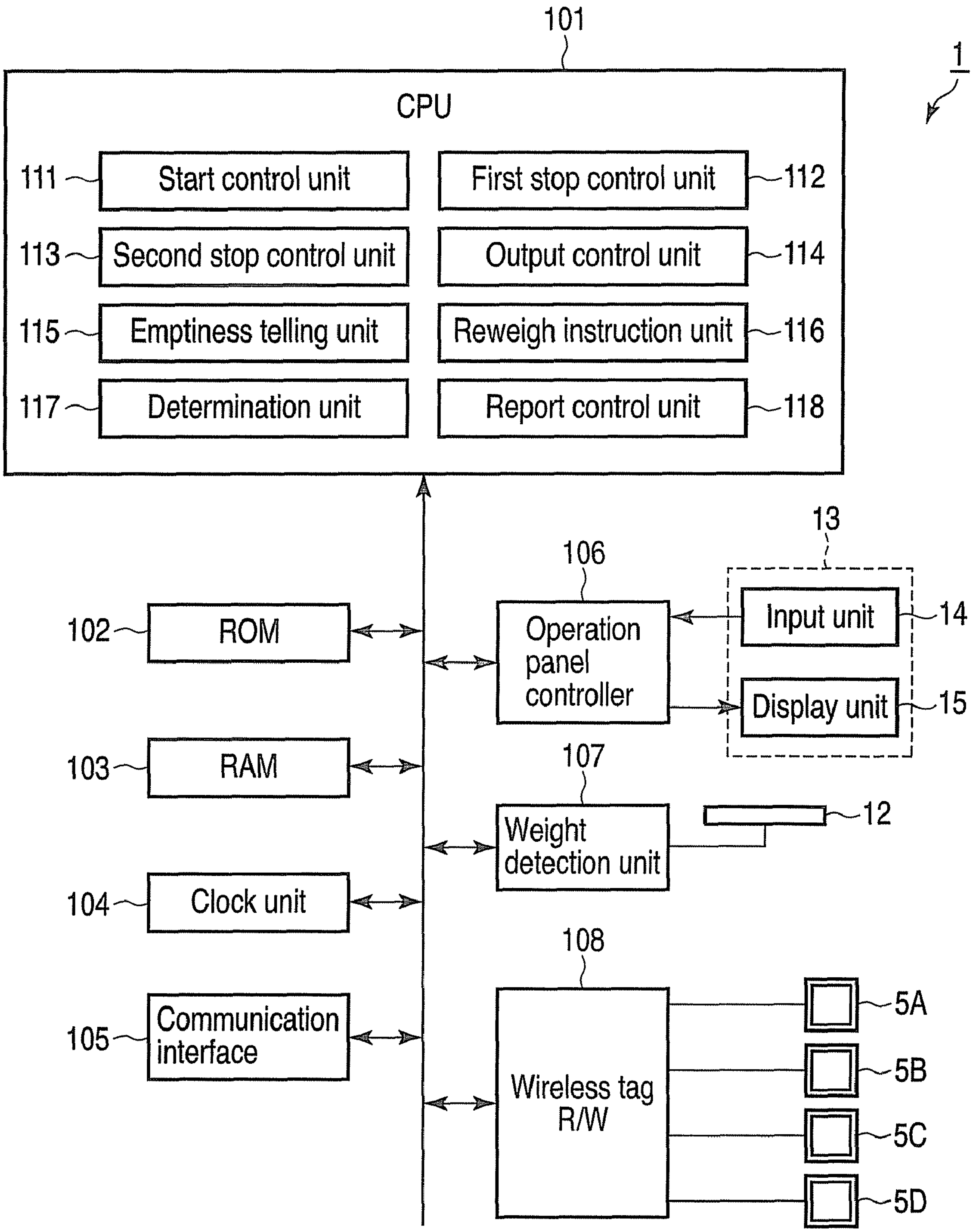
F I G. 5

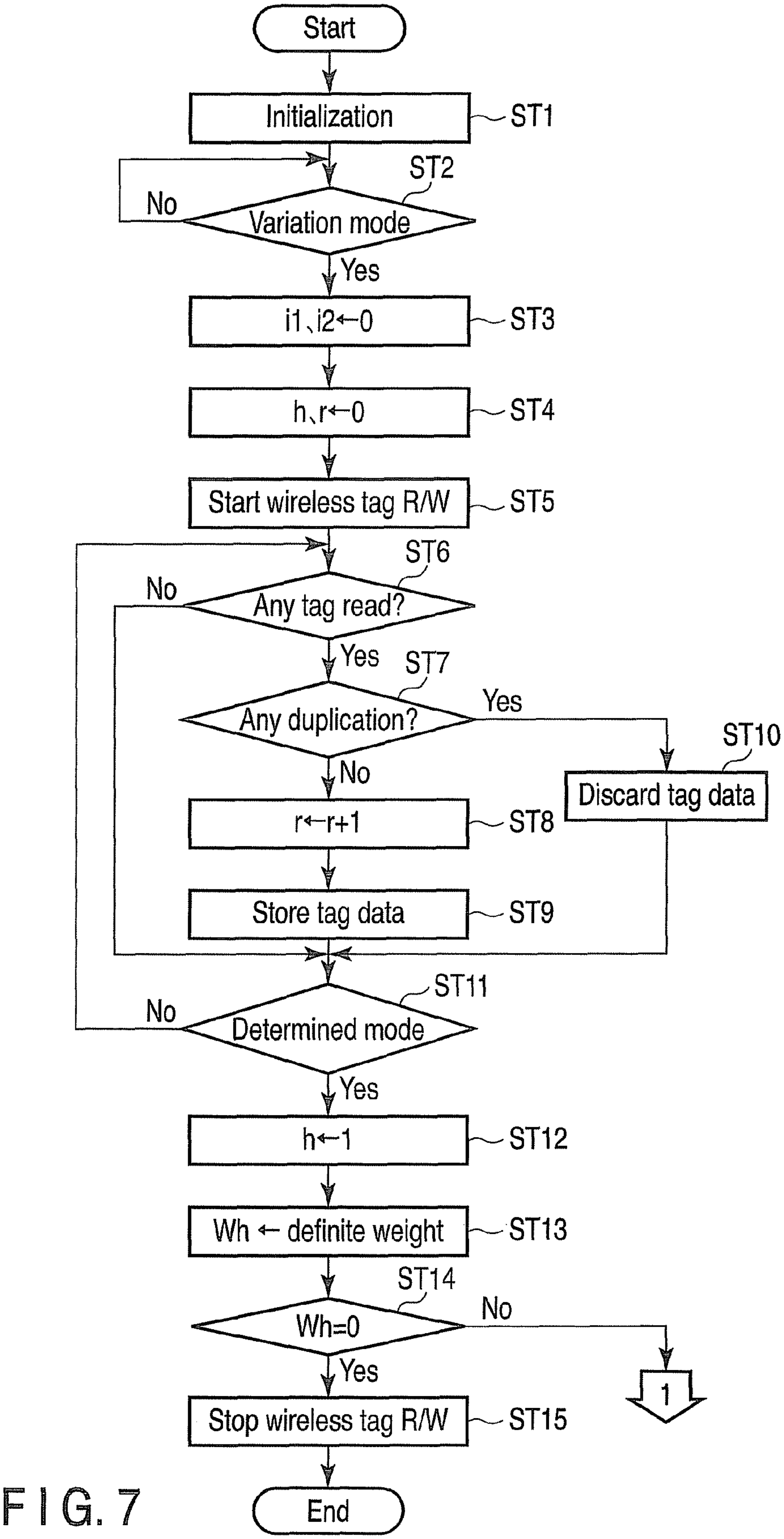
F I G. 7

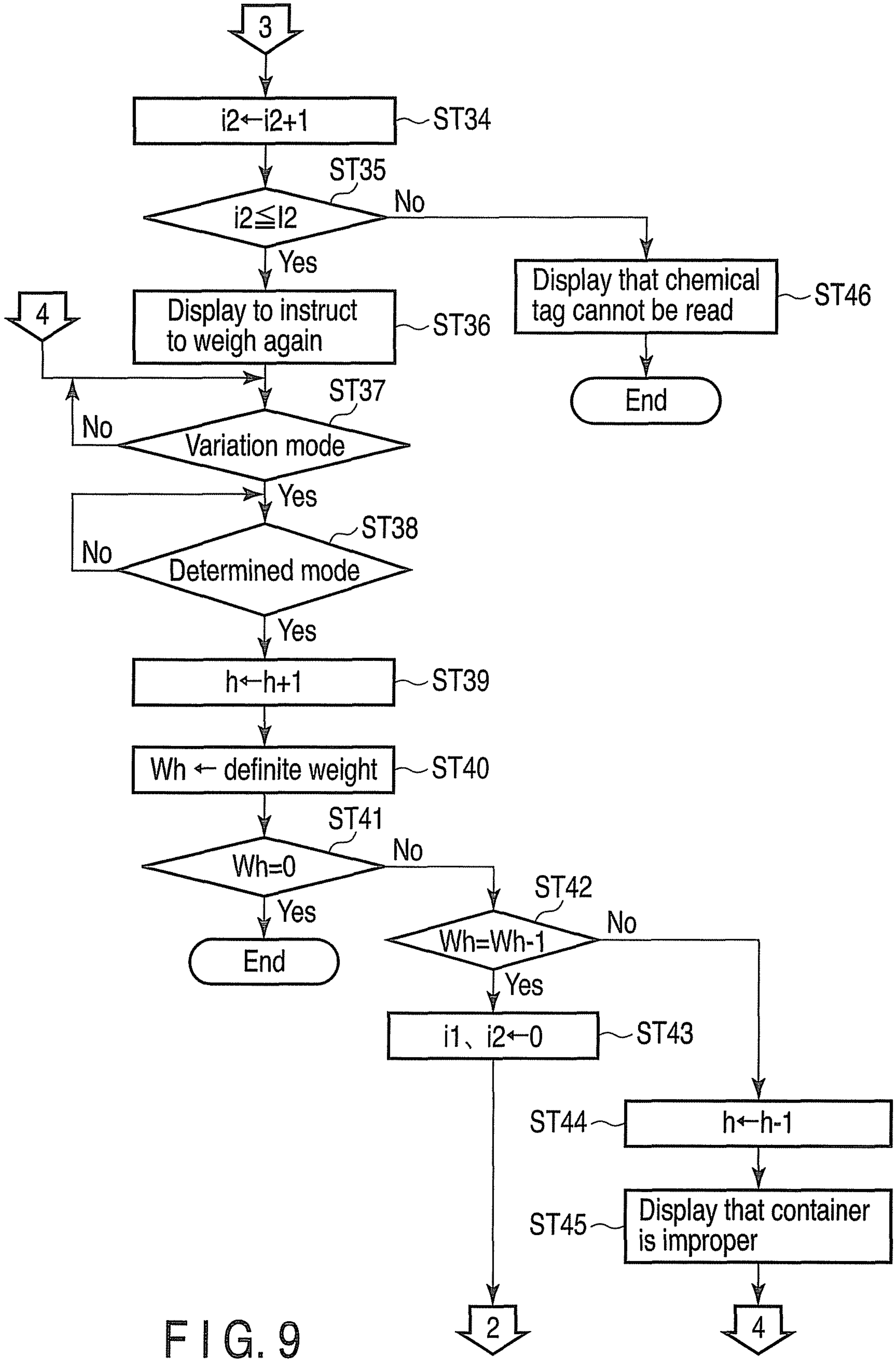
F I G. 9

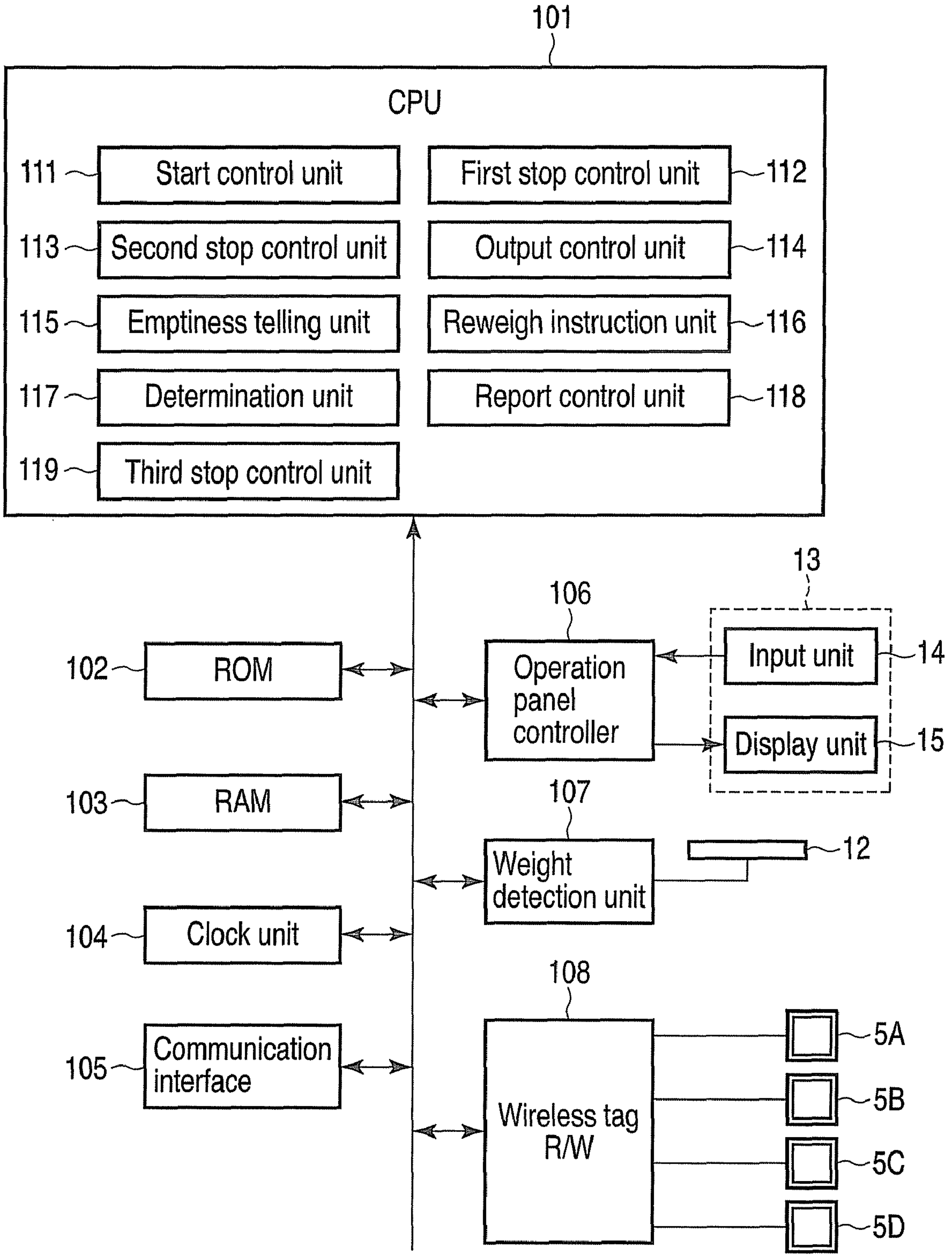
F I G. 15

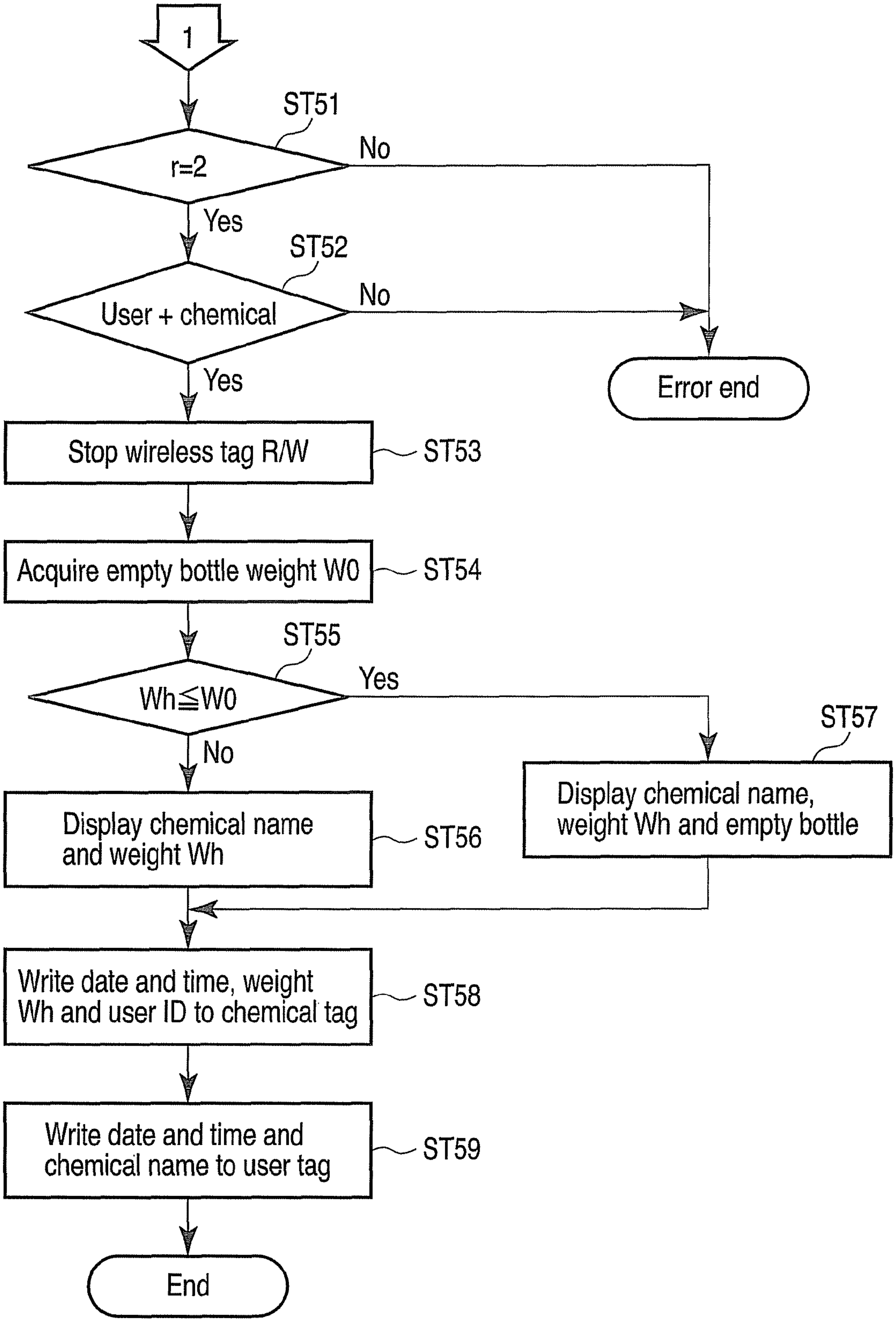
F I G. 16

COMMODITY MANAGEMENT APPARATUS

CROSS-REFERENCE TO RELATED APPLICATION

This application is based upon and claims the benefit of priority from prior Japanese Patent Application No. 2008-311449, filed Dec. 5, 2008, the entire contents of which are incorporated herein by reference.

TECHNICAL FIELD

The present invention relates to a commodity management apparatus for managing the kind, remaining amount, etc. of a commodity contained in a container in accordance with data in a wireless tag attached to the container and in accordance with the weight of the container.

BACKGROUND

Jpn. Pat. Appln. KOKOKU Publication No. 3598341 discloses a commodity management apparatus for managing the kind, remaining amount, etc. of a chemical contained in a chemical bottle in accordance with data in a wireless tag attached to the bottle and in accordance with the weight of the bottle. This apparatus includes an electronic weighing scale for weighing the chemical bottle mounted on a weighing dish, and a wireless tag reader/writer for contactlessly reading the data in the wireless tag attached to the chemical bottle using an antenna.

In this apparatus, the antenna for the wireless tag reader/writer is provided in the weighing dish of the electronic weighing scale. The antenna has directivity in a direction perpendicular to the surface of the weighing dish.

A passive wireless tag is attached to the chemical bottle. The passive wireless tag does not have its own power source. The passive wireless tag generally has a coil antenna, and generates electricity when a great amount of radio waves traverses the surface of the coil antenna. When the wireless tag generates electricity, the wireless tag reader/writer can read the data in the wireless tag.

Therefore, in this apparatus, the wireless tag has to be attached to the bottom surface of the chemical bottle so that a great amount of radio waves emitted from the antenna traverses the surface of the coil antenna of the wireless tag. If the wireless tag is affixed to some part other than the bottom surface, the efficiency of reading the wireless tag is significantly reduced.

However, the bottom of a container is not necessarily hollow. The wireless tag has its own thickness. Therefore, when the wireless tag is attached to the bottom surface of the container, the wireless tag may project from the bottom surface of the container. If the wireless tag projects from the bottom surface of the container, the container is not stable when mounted on the weighing dish, and may fall down while being weighed. Moreover, when the container is placed on, for example, a shelf or a table, the wireless tag is in contact with the mounting surface, so that the wireless tag tends to deteriorate. If the mounting surface is wet, the deterioration of the wireless tag accelerates.

Furthermore, in this apparatus, the antenna is provided in the weighing dish of the electronic weighing scale. In general, the scale requires the leveling of the weighing dish and a zero adjustment. However, such adjustments are difficult when the antenna is provided in the weighing dish, which is impractical.

SUMMARY

The present invention has been contrived on the basis of these circumstances, and an object thereof is to provide a commodity management apparatus is practical, the wireless tag has not to be attached to the bottom surface of the container and the scale doesn't cause the obstacle to the leveling of the weighing dish and a zero adjustment.

According to one aspect of the present invention, a commodity management apparatus includes, a weighing dish on which a container having a wireless tag attached thereto is mounted, an antenna which forms a region to communicate with the wireless tag from the side part of the weighing dish to the upper part of the weighing dish, a tag reader which contactlessly reads, via the antenna, data in the wireless tag attached to the container, a weight detection unit which detects the weight of the container mounted on the weighing dish, and an output control unit which outputs the weight of the container detected by the weight detection unit and the data in the wireless tag read by the tag reader.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 1 is a perspective view showing the external configuration of a commodity management apparatus in a first embodiment of the present invention;

FIG. 2 is a plan view showing the external configuration of the commodity management apparatus in the first embodiment;

FIG. 3 is a schematic view showing one example of chemical bottles used in the first embodiment;

FIG. 4 is a view showing one example of data stored in a memory in a chemical tag used in the first embodiment;

FIG. 5 is a block diagram showing the internal configuration of the commodity management apparatus in the first embodiment;

FIG. 6 is a view showing a main memory area formed in a RAM of the commodity management apparatus in the first embodiment;

FIG. 7 is a flowchart showing steps ST1 to ST15 in a processing procedure to be performed by a CPU of the commodity management apparatus in the first embodiment;

FIG. 9 is a flowchart showing steps ST34 to ST46 in the processing procedure to be performed by the CPU of the commodity management apparatus in the first embodiment;

FIG. 15 is a block diagram showing the internal configuration of the commodity management apparatus in the fourth embodiment; and FIG. 16 is a flowchart showing essential parts of steps ST51 to ST59 in a processing procedure to be performed by a CPU of the commodity management apparatus in the fourth embodiment.

DETAILED DESCRIPTION

Figure 8:
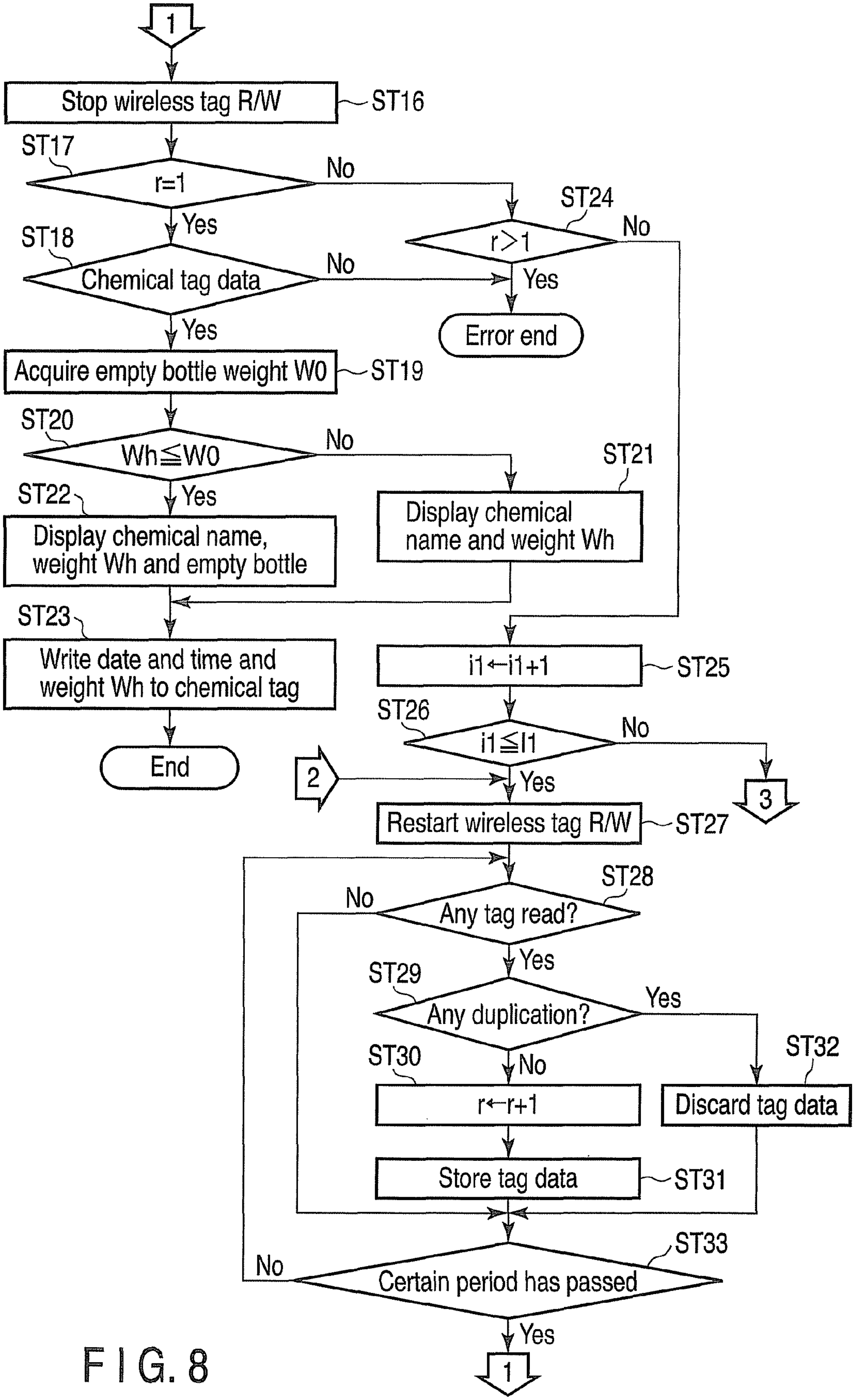
FIG. 8 is a flowchart showing steps ST16 to ST33 in the processing procedure to be performed by the CPU of the commodity management apparatus in the first embodiment.

First to fourth embodiments according to the present invention will hereinafter be described with reference to the drawings.

In each of the embodiments, the present invention is applied to a commodity management apparatus for managing the kind, amount, etc. of a chemical contained in a chemical bottle. The chemical bottle is a container containing a chemical such as a medicine or a reagent. The commodity management apparatus manages the kind, amount, etc. of the chemical contained in the chemical bottle in accordance with the weight of the chemical bottle and in accordance with data in a wireless tag attached to the chemical bottle.

First Embodiment

The external configuration of a commodity management apparatus 1 according to the first embodiment is described using the perspective view in FIG. 1 and the plan view in FIG. 2.

The commodity management apparatus 1 is connected to a personal computer 3 via a communication line 2 such as a local area network (LAN). The personal computer 3 functions as upper equipment of the commodity management apparatus 1.

The commodity management apparatus 1 has an apparatus main body 11 in the shape of a rectangular-parallelepiped or cubic box. A weighing dish 12 is attached onto the upper surface of the apparatus main body 11. An operation panel 13 is attached onto the front surface of the apparatus main body 11. The operation panel 13 has an input unit 14 configured by a keyboard, and a display unit 15 configured by a liquid crystal display.

The weighing dish 12 is quadrangular when viewed from above. An antenna attachment member 4 is disposed along the outer periphery of the weighing dish 12 at a given distance d from the peripheral edge of the weighing dish 12. In addition, the weighing dish 12 is not exclusively quadrangular. For example, the weighing dish 12 may be circular.

The antenna attachment member 4 attaches an antenna 5 of a wireless tag reader/writer 108. In the first embodiment, four planar antennas 5A, 5B, 5C, 5D are fixed to the antenna attachment member 4, as shown in FIGS. 1 and 2.

The planar antenna 5A is fixed to the upper part of the inner surface of the antenna attachment member 4 located on the front side of the apparatus main body 11 so that the surface of this antenna is directed toward the weighing dish 12. The planar antenna 5B is fixed to the upper part of the inner surface of the antenna attachment member 4 located on the right side of the apparatus main body 11 when viewed from the front side thereof so that the surface of this antenna is directed toward the weighing dish 12. The planar antenna 5C is fixed to the upper part of the inner surface of the antenna attachment member 4 located on the rear side of the apparatus main body 11 so that the surface of this antenna is directed toward the weighing dish 12. The planar antenna 5D is fixed to the upper part of the inner surface of the antenna attachment member 4 located on the left side of the apparatus main body 11 when viewed from the front side thereof so that the surface of this antenna is directed toward the weighing dish 12.

The lower end faces of the planar antennas 5A to 5D are substantially flush with the upper surface of the weighing dish 12. Thus, the planar antenna 5A forms a communication area with a wireless tag from the front side of the weighing dish 12 to the upper side of the weighing dish 12. The planar antenna 5B forms a communication area with the wireless tag from the right side of the weighing dish 12 to the upper side of the weighing dish 12. The planar antenna 5C forms a communication area with the wireless tag from the rear side of the weighing dish 12 to the upper side of the weighing dish 12. The planar antenna 5D forms a communication area with the wireless tag from the left side of the weighing dish 12 to the upper side of the weighing dish 12.

Thus, the four planar antennas 5A to 5D are fixed to the antenna attachment member 4 so that the surfaces of these antennas are in different directions.

FIG. 3 shows one example of chemical bottles 6. The chemical bottle 6 is prepared for each chemical. A name label 7 is affixed to the side surface of the chemical bottle 6. The name label 7 indicates the name of the chemical (e.g., “chemical A” or “chemical B”), and an identification code (e.g., “1234567890” or “1357924680”) of the chemical. The name label 7 also fixes a wireless tag 8. The wireless tag 8 may be fixed by being affixed to the surface of the name label 7. Alternatively, the wireless tag 8 may be fixed by being held between the chemical bottle 6 and the name label 7.

The wireless tag 8 is a passive wireless tag which does not have its own power source. The wireless tag is equipped with an antenna and an IC chip. When carrier waves emitted from the planar antennas 5A to 5D are received by the antenna of the wireless tag, the wireless tag uses electric power of the carrier waves to wirelessly transmit tag data stored in a memory of the IC chip from the antenna. The wireless tag also uses the electric power of the carrier waves to write data received by the antenna to the memory of the IC chip.

In addition, a magnetic-field-type wireless tag adapted to, for example, a frequency band of 13.56 MHz mainly has a coil antenna as an antenna. In contrast, an electric-field-type wireless tag adapted to ultra high frequency (UHF) or a frequency band of about 2.45 MHz mainly has a dipole antenna or loop antenna as an antenna.

FIG. 4 shows one example of data stored in a memory in the chemical tag 8. The data is made up of a tag data 81 for identifying the chemical tag 8, and a plurality of pieces of history data 82. The pieces of the history data 82 include the measurement date and time, and weight data.

The tag data 81 includes item data: a tag ID, a tag classification code, a chemical name, an identification code and an empty bottle weight “W0”. The tag ID is an inherent code set to be different for each of the chemical tags 8. The tag classification code is a code for identifying the wireless tag as the chemical tag 8. The chemical name and the identification code are the name and identification code of the chemical contained in the chemical bottle 6 to which the chemical tag 8 is attached. The empty bottle weight “W0” is the weight of the chemical bottle 6 when no chemical is contained in the chemical bottle 6 to which the chemical tag 8 is attached.

FIG. 5 is a block diagram showing the internal configuration of the commodity management apparatus 1. The commodity management apparatus 1 has, in the apparatus main body 11, a central processing unit (CPU) 101, a read only memory (ROM) 102, a random access memory (RAM) 103, a clock unit 104, a communication interface 105, an operation panel controller 106, a weight detection unit 107, and the wireless tag reader/writer 108.

A bus line 109 connects the CPU 101 to the ROM 102, the RAM 103, the clock unit 104, the communication interface 105, the operation panel controller 106, the weight detection unit 107 and the wireless tag reader/writer 108.

The wireless tag reader/writer 108 includes a transmitter, a receiver, a circulator, an antenna switch, and a controller for controlling these components. The transmitter has a modulator and an amplifier. The modulator modulates a carrier wave signal by data to be transmitted to the wireless tag. The amplifier amplifies the carrier wave signal. The amplified carrier wave signal is supplied to the circulator. The circulator has a function to supply the antennas 5A to 5D with the signal input from the transmitter, and a function to supply the receiver with signals received by the antennas 5A to 5D.

The receiver has an amplifier and a demodulator. The amplifier amplifies the signal received from each of the antennas 5A to 5D. The demodulator demodulates received data from the amplified received signal. The demodulated received data is supplied to the controller.

The controller has a function to supply transmission data to the transmitter in accordance with an instruction from the CPU 101, and a function to acquire tag data from the received data demodulated in the receiver. Moreover, the controller controls the switch operation of the antenna switch. The antenna switch sequentially switches the connection between the circulator and the antennas 5A to 5D.

Here, the wireless tag reader/writer 108 functions as a tag reader capable of contactlessly reading, via the antennas 5A to 5D, data in the wireless tag (chemical tag 8) attached to the container (chemical bottle 6) mounted on the weighing dish 12.

The weight detection unit 107 detects the weight of a commodity mounted on the weighing dish 12. The weight detection unit 107 has a variation mode which is set during the measurement of the weight, and a weight determined mode which is set after the weight is determined.

The operation panel controller 106 controls the input unit 14 and the display unit 15 provided in the operation panel 13. The communication interface 105 controls the data communication with the personal computer 3 connected via the communication line 2. The clock unit 104 keeps the current date and time.

The RAM 103 stores variable data such as input data and operation data. A main memory area formed in the RAM 103 is shown in FIG. 6. The commodity management apparatus 1 forms a counter area and a buffer area in the RAM 103.

The counter area includes a first retry counter "i1", a second retry counter i2, a weight data counter "h" and a tag data counter "r". The buffer area includes a weight data buffer 91 and a tag data buffer 92.

The weight data buffer 91 has a plurality of weight data areas whose addresses are represented by count values in the weight data counter "h". The tag data buffer 92 has a plurality of tag data areas whose addresses are represented by count values in the tag data counter "r".

The ROM 102 stores fixed data for, for example, a program.

In accordance with the program stored in the ROM 102, the CPU 101 executes processing of a procedure shown in the flowcharts in FIGS. 7 to 9. In this processing, the CPU 101 functions as a start control unit 111, a first stop control unit 112, a second stop control unit 113, an output control unit 114, an emptiness telling unit 115, a reweigh instruction unit 116, a determination unit 117 and a report control unit 118. Details of the functions will be clarified by the following explanations.

When a reset signal is input by the depression of, for example, a reset button provided in the input unit 14, the CPU 101 starts this processing. First, in step ST1, the CPU 101 performs initialization. The weight detection unit 107 is set to the weight determined mode by this initialization. The wireless tag reader/writer 108 becomes inactive.

Then, in step ST2, the CPU 101 waits for the weight detection unit 107 to switch to the variation mode. If a commodity is put on the weighing dish 12 and the amount of detection changes accordingly, the weight detection unit 107 switches from the weight determined mode to the variation mode, and starts weighing. When the weight detection unit 107 switches to the variation mode (YES in ST2), the CPU 101 resets both the first retry counter "i1" and the second retry counter i2 to "0", in step ST3. Further, in step ST4, the CPU 101 resets both the weight data counter "h" and the tag data counter "r" to "0".

Subsequently, in step ST5, the CPU 101 instructs the wireless tag reader/writer 108 to start (the start control unit 111).

The wireless tag reader/writer 108 instructed to start generates a command to read data in the wireless tag. Then, carrier wave signals modulated by this data read command are sequentially supplied to the antennas 5A to 5D.

Radio waves corresponding to the carrier wave signals are emitted into the air from the antennas 5A to 5D to which the carrier wave signals have been supplied. The frequency band of the radio waves is the UHF. The UHF radio waves emitted from the antennas 5A to 5D reach a region above the weighing dish 12. Thus, if the chemical bottle 6 is mounted on the weighing dish 12, the chemical tag 8 attached to the side surface of the chemical bottle 6 reliably receives the radio waves from at least one of the antennas 5A to 5D.

Receiving the radio waves, the wireless tag demodulates the radio waves and thus comprehends the command. When the command is a data read command, the tag data in the memory is read. The read tag data is wirelessly transmitted to the wireless tag reader/writer 108 by a back scatter scheme.

A signal of the tag data wirelessly transmitted from the wireless tag is received by the antennas 5A to 5D, and taken into the wireless tag reader/writer 108. The wireless tag reader/writer 108 reads the tag data from the received signal, and reports the tag data to the CPU 101.

The CPU 101 which has instructed the wireless tag reader/writer 108 to start waiting for the tag data to be read by the wireless tag reader/writer 108, in step ST6. When the tag data is read (YES in ST6), the CPU 101 searches the tag data buffer 92 to determine whether the same tag data as the currently read tag data has already been stored, in step ST7.

When the same tag data as the currently read tag data is not stored in the tag data buffer 92, that is, when there is no duplication (NO in ST7), the CPU 101 increments the tag data counter "r" by "1", in step ST8. Then, in step ST9, the CPU 101 stores the currently read tag data in a data area of the tag data buffer 92 which uses the value of the tag data counter "r" as an address.

On the contrary, when the same tag data as the currently read tag data is already stored in the tag data buffer 92, that is, when there is duplication (YES in ST7), the CPU 101 discards the currently read tag data, in step ST10.

When the processing in step ST9 or step ST10 is finished, the CPU 101 determines whether the weight detection unit

107 has switched to the weight determined mode, in step ST11. When the weight detection unit 107 has not switched to the weight determined mode, the CPU 101 waits for the next wireless tag data to be read.

Thus, until the weight detection unit 107 switches from the variation mode to the weight determined mode, the CPU 101 waits for the data in the wireless tag to be read. Then, whenever the data in the wireless tag is read, the CPU 101 sequentially performs the processing in steps ST7, ST8 and ST9 or in steps ST7 and ST10.

When the weighing is finished in the weight detection unit 107 and a definite weight "Wh" is obtained, the weight detection unit 107 switches to the weight determined mode. When the weight detection unit 107 switches to the weight determined mode (YES in ST11), the CPU 101 increments the weight data counter "h" by "1", in step ST12. Then, in step ST13, the CPU 101 stores the currently measured definite weight "Wh" in a data area of the weight data buffer 91 which uses the value of the weight data counter "h" as an address.

Then, in step ST14, the CPU 101 determines whether the definite weight "Wh" is "0". For example, if a user of the commodity management apparatus 1 has mounted the chemical bottle 6 on the weighing dish 12 but removes the chemical bottle 6 from the weighing dish 12 before the determination of the weight thereof, then the definite weight "Wh" is "0".

When the definite weight "Wh" is "0" (YES in ST14), the CPU 101 instructs the wireless tag reader/writer 108 to stop (the second stop control unit 113), in step ST15. Thus, the CPU 101 finishes the current processing.

The wireless tag reader/writer 108 instructed to stop stops the emission of the radio waves from the antennas 5A to 5D.

When the definite weight "Wh" is not "0", that is, when the definite weight "Wh" is greater than "0" (NO in ST14), the CPU 101 instructs the wireless tag reader/writer 108 to stop (the first stop control unit 112), in step ST16. Then, in step ST17, the CPU 101 determines whether the tag data counter "r" is "1".

If there is only one kind of wireless tag read by the wireless tag reader/writer 108 during the period in which the weight detection unit 107 has switched to the variation mode and then to the weight determined mode, the tag data counter "r" is "1".

When the tag data counter "r" is "1" (YES in ST17), the CPU 101 determines, in step ST18, whether the tag data stored at an address "r", that is, an address "1" in the tag data buffer 92 is the tag data 81 in the chemical tag 8. Specifically, the CPU 101 determines whether the tag classification code of the tag data 81 is a code indicating the chemical tag 8.

When the tag data stored at the address "r" in the tag data buffer 92 is the tag data 81 in the chemical tag 8 (YES in ST18), the CPU 101 acquires the empty bottle weight "W0" from the tag data 81, in step ST19. Then, in step ST20, the CPU 101 determines whether the definite weight "Wh" stored at an address "h" in the weight data buffer 91 is equal to or less than the empty bottle weight "W0".

When the definite weight "Wh" is not equal to or less than the empty bottle weight "W0" (NO in ST20), the CPU 101 acquires a chemical name from the tag data 81, and displays this chemical name and the definite weight "Wh" on the display unit 15, in step ST21 (the output control unit 114).

When the definite weight "Wh" is equal to or less than the empty bottle weight "W0" (YES in ST20), the CPU 101 acquires a chemical name from the tag data 81, and displays this chemical name and the definite weight "Wh" on the display unit 15, in step ST22 (the output control unit 114). The CPU 101 also displays on the display unit 15 information to tell the user that the chemical bottle 6 is empty (the emptiness telling unit 115).

When the chemical name and the definite weight "Wh" are displayed on the display unit 15 in the processing of step ST21 or step ST22, the CPU 101 takes in the current date and time kept by the clock unit 104, in step ST23. Then, the CPU 101 instructs the wireless tag reader/writer 108 to write the history data including the date and time and the definite weight "Wh". Thus, the CPU 101 finishes the current processing.

The wireless tag reader/writer 108 which has received the write instruction generates a command to write data to the wireless tag. This command includes the history data received from the CPU 101. The wireless tag reader/writer 108 sequentially supplies the antennas 5A to 5D with carrier wave signals modulated by the data write command.

Radio waves corresponding to the carrier wave signals are emitted from the antennas 5A to 5D to which the carrier wave signals have been supplied. The UHF radio waves emitted from the antennas 5A to 5D reach the region above the weighing dish 12.

Thus, if the chemical bottle 6 is mounted on the weighing dish 12, the chemical tag 8 attached to the side surface of the chemical bottle 6 reliably receives the radio waves from at least one of the antennas 5A to 5D.

Receiving the radio waves, the chemical tag 8 demodulates the radio waves and thus comprehends the command. When the command is a data write command, write data contained in the command, that is, the history data including the date and time and the definite weight "Wh" is written to the memory.

In the meantime, the UHF radio waves emitted from the antennas 5A to 5D may not remain above the weighing dish 12 and may extend farther. Therefore, for example, if there is a wireless tag other than the chemical tag 8 around the commodity management apparatus 1, there is a probability that the wireless tag reader/writer 108 may also read data in this wireless tag.

If the wireless tag reader/writer 108 only reads the data in the wireless tag other than the chemical tag 8 before the weight detection unit 107 detects the definite weight "Wh", the data in the wireless tag other than the chemical tag 8 is stored at the address "r" in the tag data buffer 92.

When the data in the wireless tag other than the chemical tag 8 is thus stored at the address "r" in the tag data buffer 92 (NO in ST18), the CPU 101 displays on the display unit 15 a message to report a tag read error to the user. Thus, the CPU 101 finishes the current processing.

Furthermore, if the wireless tag reader/writer 108 reads the data in the chemical tag 8 and data in another wireless tag therearound (including the chemical tag 8) before the weight detection unit 107 detects the definite weight "Wh", the tag data counter "r" is greater than "1".

When the tag data counter "r" is thus greater than "1" (NO in ST17 and YES in ST24), the CPU 101 displays on the display unit 15 a message to report a tag read error to the user. Then, the CPU 101 finishes the current processing.

If the wireless tag reader/writer 108 cannot read any data in any wireless tag before the weight detection unit 107 detects the definite weight "Wh", the tag data counter "r" remains at "0".

When the tag data counter "r" is "0" (NO in ST17 and NO in ST24), the CPU 101 increments the first retry counter "i1" by "1", in step ST25. Then, in step ST26, the CPU 101 determines whether the first retry counter "i1" is equal to or less than a set value "I1". The set value "I1" is the number of read operations to be retried, and can be set to a given value by the user within a preset range (e.g., 1 to 6).

When the first retry counter "i1" is equal to or less than the set value "I1" (YES in ST26), the commodity management apparatus 1 can retry the read operation. In this case, in step ST27, the CPU 101 instructs the wireless tag reader/writer 108 to restart. Then, in step ST28, the CPU 101 waits for the tag data to be read.

If the tag data is read (YES in ST28), the CPU 101 searches the tag data buffer 92 to determine whether the same tag data as the currently read tag data has already been stored, in step ST29.

When there is no duplication (NO in ST29), the CPU 101 increments the tag data counter "r" by "1", in step ST30. Then, in step ST31, the CPU 101 stores the currently read tag data in the data area of the tag data buffer 92 which uses the value of the tag data counter "r" as an address.

On the contrary, when there is duplication (YES in ST29), the CPU 101 discards the currently read tag data, in step ST32.

When the processing in step ST31 or step ST32 is finished, the CPU 101 determines whether a certain period has passed since the CPU 101 had instructed the wireless tag reader/writer 108 to restart, in step ST33.

The certain period is much longer than the time necessary for the wireless tag reader/writer 108 to read the wireless tag on the weighing dish 12. For example, the certain period is the average time necessary for the weight detection unit 107 to switch to the variation mode and then to the weight determined mode.

When the certain period has not passed since the CPU 101 had instructed the wireless tag reader/writer 108 to restart (NO in ST33), the CPU 101 waits for the next tag data to be read.

Thus, until the certain period passes since the CPU 101 has instructed the wireless tag reader/writer 108 to restart, the CPU 101 executes the processing in steps ST29, ST30 and ST31 or in steps ST29 and ST32 whenever the data in the wireless tag is read.

When the certain period has passed since the CPU 101 had instructed the wireless tag reader/writer 108 to restart (YES in ST33), the CPU 101 returns to the processing in step ST16. That is, the wireless tag reader/writer 108 is stopped. Then, the CPU 101 checks the tag data counter "r".

Here, when the tag data counter "r" is again "0" (NO in ST14 and NO in ST24), the CPU 101 further increments the first retry counter "i1" by "1" (ST25). Thus, when the tag data cannot be read, the processing in steps ST27 to ST33 is repeated until the first retry counter "i1" exceeds the set value "I1".

When the first retry counter "i1" has exceeded the set value "I1" (NO in step ST26), the CPU 101 increments the second retry counter i2 by "1", in step ST34. In step ST35, the CPU 101 determines whether the second retry counter i2 is equal to or less than a set value "I2". The set value "I2" is the number of weighing operations to be retried, and can be set to a given value by the user within a preset range (e.g., 1 to 3).

When the second retry counter i2 is equal to or less than the set value "I2" (YES in ST35), the commodity management apparatus 1 can retry the weighing operation. In this case, in step ST36, the CPU 101 displays on the display unit 15 a message to instruct the user to reweigh the chemical bottle (the reweigh instruction unit 116). Then, in step ST37, the CPU 101 waits for the weight detection unit 107 to switch to the variation mode.

The user instructed to reweigh once holds up the chemical bottle 6 from the weighing dish 12, and again puts the chemical bottle 6 on the weighing dish 12, thereby reweighing the chemical bottle 6. When the chemical bottle 6 is held up from the weighing dish 12, the weight detection unit 107 switches to the variation mode.

When the weight detection unit 107 has switched to the variation mode, the CPU 101 waits for the weight detection unit 107 to switch to the weight determined mode, in step ST38.

When the weight detection unit 107 has switched to the weight determined mode (YES in ST38), the CPU 101 increments the weight data counter "h" by "1", in step ST39. Then, in step ST40, the CPU 101 stores the current definite weight "Wh" in the data area of the weight data buffer 91 which uses the value of the weight data counter "h" as an address.

Then, in step ST41, the CPU 101 determines whether the definite weight "Wh" is "0". For example, if the user does not return the chemical bottle 6 to the weighing dish 12 after holding up the chemical bottle 6 from the weighing dish 12, then the definite weight "Wh" is "0".

When the definite weight "Wh" is "0" (YES in ST41), the CPU 101 finishes the current processing.

When the definite weight "Wh" is not "0", that is, when the definite weight "Wh" is greater than "0" (NO in ST41), the CPU 101 compares weight data "Wh" stored at the address "h" in the weight data buffer 91 with weight data "Wh−1" stored at an address "h−1" (determination unit 117), in step ST42.

The currently determined weight data "Wh" is stored at the address "h". The previously determined weight data "Wh−1" is stored at the address "h−1".

When the user once removes the chemical bottle 6 from the weighing dish 12 and again puts the chemical bottle 6 on the weighing dish 12, the weight data "Wh" is equal to the weight data "Wh−1". On the contrary, when another chemical bottle is put, it is highly likely that the weight data "Wh" does not coincide with the weight data "Wh−1".

When the weight data "Wh" is equal to the weight data "Wh−1" (YES in ST42), the CPU 101 resets the first and second retry counters "i1", "i2" to "0", in step ST43. Then, the CPU 101 returns to the processing in step ST27. That is, the CPU 101 again instructs the wireless tag reader/writer 108 to start, and reties reading the tag data in the chemical tag 8 attached to the reweighed chemical bottle 6.

When the weight data "Wh" is not equal to the weight data "Wh−1" (NO in ST42), the CPU 101 decrements the weight data counter "h" by "1", in step ST44. Moreover, in step ST45, the CPU 101 displays on the display unit 15 a message to report that the reweighing is improper (the report control unit 118).

Then, the CPU 101 returns to the processing in step ST37. That is, the CPU 101 waits for the weight detection unit 107 to switch from the variation mode to the weight determined mode, and then reties weighing the chemical bottle 6.

When the second retry counter i2 has exceeded the set value "I2" (NO in ST35), the CPU 101 displays on the display unit 15 a message to report that the chemical tag cannot be read, in step ST46. Thus, the CPU 101 finishes the current processing.

In the first embodiment, the four planar antennas 5A to 5D are arranged in the commodity management apparatus 1 so that the communication area with the wireless tag are formed toward the upper side of the weighing dish 12 from the front, rear, right and left sides of the weighing dish 12 on which the chemical bottle 6 is mounted. Therefore, if only the chemical tag 8 is attached to the side surface of the chemical bottle 6, the wireless tag reader/writer 108 can reliably read the data in the chemical tag 8.

Consequently, in the first embodiment, the chemical tag 8 can be attached to the side surface of the chemical bottle 6. As a result, all the disadvantages caused by the necessity of attaching the wireless tag to the bottom surface of the container can be solved.

For example, the chemical bottle 6 does not become unstable due to the chemical tag 8 attached to the bottom surface of the chemical bottle 6, so that the chemical bottle 6 can be stably mounted on the weighing dish 12 or a table. Moreover, when the chemical bottle 6 is placed on the table, the chemical tag 8 does not come into contact with the surface of the table, deterioration of the chemical tag 8 can be inhibited. Further, there is no need to tilt the chemical bottle 6 or hold the chemical bottle 6 high when visually checking the state of the chemical tag 8 attached to the chemical bottle 6, and there is therefore no fear of spilling the chemical in the chemical bottle 6.

Furthermore, in the commodity management apparatus 1, the antenna attachment member 4 is disposed at a given distance from the peripheral edge of the weighing dish 12, and the plurality of planar antennas 5A to 5D are fixed to the antenna attachment member 4 so that the surfaces of these antennas are in different directions. Therefore, there is no need to provide an antenna in the weighing dish 12. Thus, the leveling of the weighing dish 12 and a zero adjustment are easy in the commodity management apparatus 1.

Still further, in the commodity management apparatus 1, the wireless tag reader/writer 108 automatically starts when the chemical bottle 6 is placed on the weighing dish 12 and the weight detection unit 107 switches to the variation mode. Then, radio waves are output from the antennas 5A to 5D to the weighing dish 12.

Thus, simply by placing the chemical bottle 6 on the weighing dish 12, the measurement of the weight of the chemical bottle 6 and the reading of the chemical tag 8 attached to the chemical bottle 6 are carried out at the same time. Therefore, the commodity management apparatus 1 is easy to use and enables efficient operation.

Furthermore, the commodity management apparatus 1 stops the wireless tag reader/writer 108 if the detection amount in the weight detection unit 107 is stable and the weight detection unit 107 switches to the determined mode. When the detection amount in the weight detection unit 107 is zero, the commodity management apparatus 1 stops the wireless tag reader/writer 108.

Thus, in the commodity management apparatus 1, unnecessary electric wave outputs from the antennas 5A to 5D are minimized, so that power can be saved. Moreover, interference with other radio stations is reduced.

Furthermore, the commodity management apparatus 1 urges to reweigh the chemical bottle 6 when the chemical tag 8 is unsuccessfully read. One reason that the data in the chemical tag 8 cannot be read is the directional relation between the antennas 5A to 5D and the chemical tag 8. When urged to reweigh the chemical bottle 6, the user once removes the chemical bottle 6 from the weighing dish 12. Then, the user again puts the chemical bottle 6 on the weighing dish 12. At this moment, the relative directions of the antennas 5A to 5D and the chemical tag 8 change, which increases the possibility that the data in the chemical tag 8 is read. Therefore, in the commodity management apparatus 1, the accuracy of reading the chemical tag 8 can be improved by urging the user to reweigh.

In this case, if the chemical bottle 6 removed from the weighing dish 12 is different from the chemical bottle 6 remounted, improperness of the reweighing is reported. Thus, the commodity management apparatus 1 can warn the user that an erroneous operation other than reweighing has been performed.

Furthermore, in the first embodiment, the empty bottle weight "W0" of the chemical bottle 6 to which the chemical tag 8 is attached is stored in the memory of the chemical tag 8. When the measured definite weight "Wh" is equal to or less than the empty bottle weight "W0", the commodity management apparatus 1 reports that the chemical bottle 6 is empty. Therefore, when the chemical bottle 6 is empty, the commodity management apparatus 1 can reliably report the fact to the user.

Second Embodiment

Figure 10:
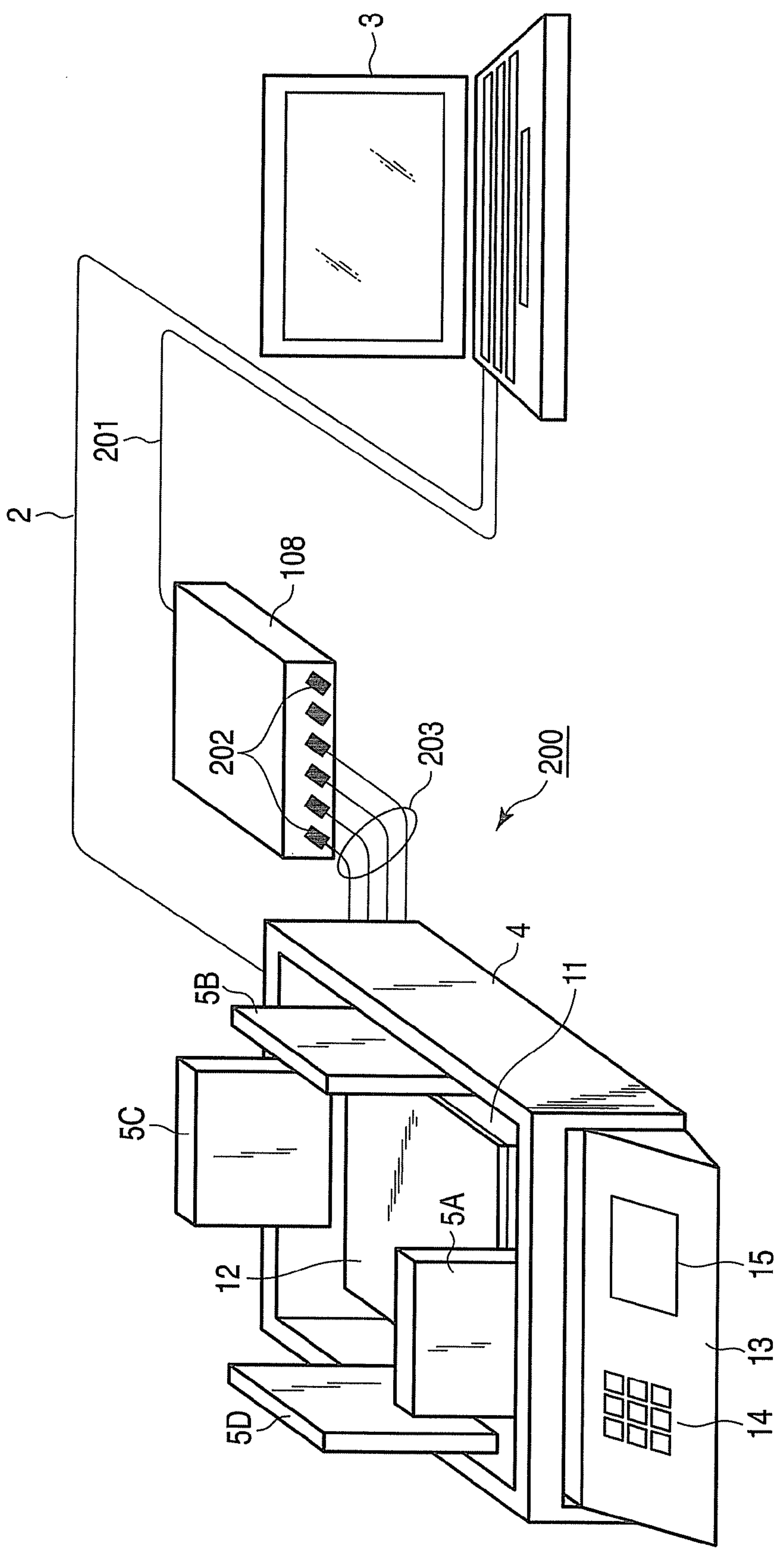
FIG. 10 is a perspective view showing the external configuration of a commodity management apparatus in a second embodiment of the present invention.

The external configuration of a commodity management apparatus 200 according to the second embodiment will be described using the perspective view in FIG. 10. It is to be noted that parts similar to the parts in the first embodiment are provided with the same reference numbers and are not described in detail.

In the commodity management apparatus 200, a wireless tag reader/writer 108 is provided outside an apparatus main body 11. The wireless tag reader/writer 108 is connected to a personal computer 3 via an exclusive communication line 201. The wireless tag reader/writer 108 has a plurality of antenna terminals 202. Antennas 5A to 5D are connected to the antenna terminals 202, respectively.

In the second embodiment, the commodity management apparatus 200 forms a memory area shown in FIG. 6 in a RAM 103, as in the first embodiment. Then, a CPU 101 performs the procedure of the processing shown in the flowcharts in FIGS. 7 to 9.

Thus, the commodity management apparatus 200 exerts functional effects similar to the functional effects in the first embodiment. An additional advantage of the commodity management apparatus 200 is that an existing electronic charge scale can be used, as it is, as the apparatus main body 11.

In addition, in the first or second embodiment, the number of antennas 5 is not limited to four, and can be a suitable number. For example, there may be only one antenna 5.

When there is only one antenna 5, it is only necessary to dispose a chemical tag 8 face to face with the surface of the antenna 5 when a chemical bottle 6 is mounted on a weighing dish 12. Since the chemical tag 8 is provided on the side surface of the chemical bottle 6, the user can easily arrange the antenna 5 and the chemical tag 8 face to face with each other.

There may be two antennas 5. The two antennas are arranged on either the front or rear side of the weighing dish 12 and on either the right or left side thereof. Thus, there is less limitation in direction when the chemical bottle 6 is mounted on the weighing dish 12.

Otherwise, the number of antennas may be three or may be five or more. In short, it is only necessary to arrange one antenna 5 or plurality of antennas 5 in such a manner as to form communication area with the wireless tag from the side part of the weighing dish 12 to the upper part of the weighing dish 12.

Furthermore, an antenna attachment member 4 does not necessarily have to be quadrangular. The antenna attachment member 4 has only to be shaped so that the antennas 5 can be attached at a given distance from the peripheral edge of the weighing dish 12 to form the communication area with the wireless tag from the side part of the weighing dish 12 to the upper part of the weighing dish 12.

Third Embodiment

Figure 11:
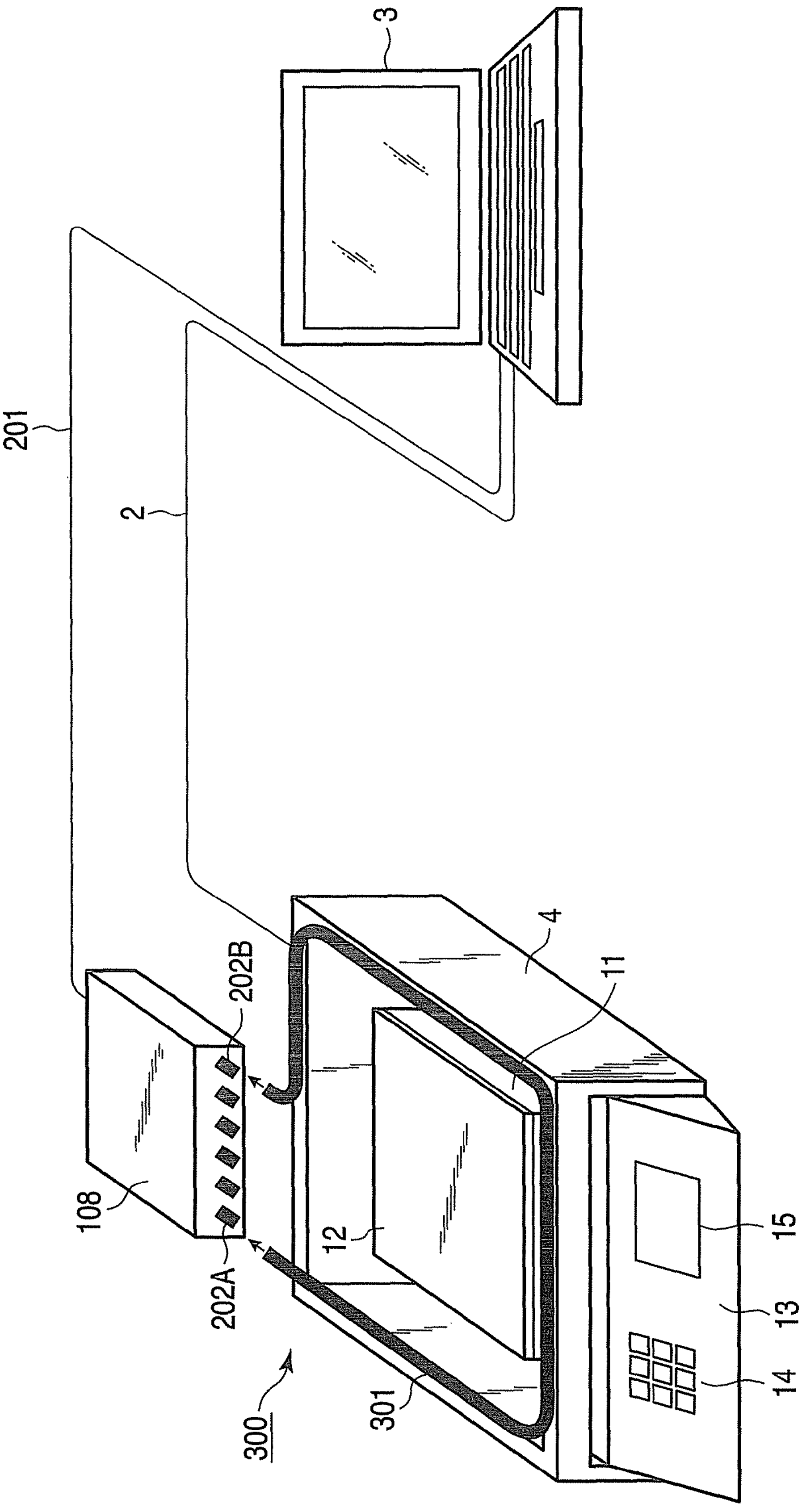
FIG. 11 is a perspective view showing the external configuration of a commodity management apparatus in a third embodiment of the present invention.

The external configuration of a commodity management apparatus 300 according to the third embodiment will be described using the perspective view in FIG. 11. It is to be noted that parts similar to the parts in the second embodiment are provided with the same reference numbers and are not described in detail.

In the commodity management apparatus 300, a leaky coaxial cable 301 is laid on the upper surface of an antenna attachment member 4 along the outer periphery of a weighing dish 12. The leaky coaxial cable 301 is one aspect of a leaky transmission path. The leaky coaxial cable 301 has one end connected to an antenna terminal 202A of a wireless tag reader/writer 108 and the other end connected to an end terminal 202B of the wireless tag reader/writer 108.

The leaky coaxial cable 301 has bores provided in its parts. If a signal is passed to the leaky coaxial cable 301 from the antenna terminal 202A of the wireless tag reader/writer 108, this signal flows to the end terminal 202B through the leaky coaxial cable 301. At the same time, radio waves are emitted from the bores.

The leaky coaxial cable 301 is provided on the antenna attachment member 4 so that the bores are directed inward, that is, so that all the radio waves emitted from the bores are directed from the side part of the weighing dish 12 to the upper part of the weighing dish 12.

In the third embodiment, the commodity management apparatus 300 forms a memory area shown in FIG. 6 in a RAM 103, as in the second embodiment. Then, a CPU 101 performs the procedure of the processing shown in the flowcharts in FIGS. 7 to 9.

Thus, the commodity management apparatus 300 exerts functional effects similar to the functional effects in the second embodiment. Moreover, there is no limitation in the direction of the chemical bottle 6 when the chemical bottle 6 is mounted on the weighing dish 12, so that the efficiency of the operation is further enhanced.

Furthermore, as compared with the planar antenna, the leaky coaxial cable 301 makes it possible to narrow the region for emitting the radio waves. Thus, there is a low risk that data in an unnecessary tag may be read. There is also an advantage when the interference of the radio waves is considered.

In addition, in the third embodiment, the leaky transmission path is not limited to the leaky coaxial cable 301. For example, a feeder line may be used as the leaky transmission path.

Fourth Embodiment

The external configuration of a commodity management apparatus 400 according to the fourth embodiment will be described using the perspective view in FIG. 12. It is to be noted that parts similar to the parts in the first embodiment are provided with the same reference numbers and are not described in detail.

In the commodity management apparatus 400, a user card holder 401 is formed at one corner of an antenna attachment member 4. A user card 402 is placed in the user card holder 401.

Figure 13:
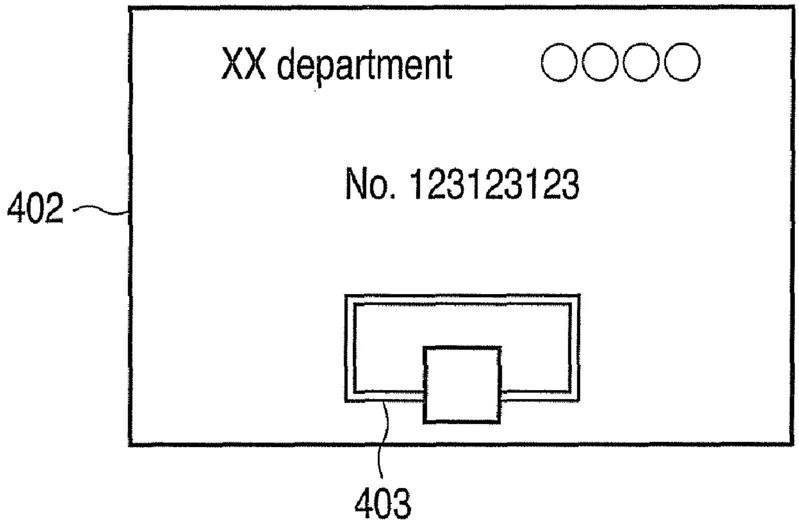
FIG. 13 is a plan view showing the external configuration of a user card used in the fourth embodiment.

One example of the user card 402 is shown in FIG. 13. The user card 402 is an ID card distributed to each user who is permitted to use the commodity management apparatus 400. The user card 402 has a user tag 403 therein. Similarly to the chemical tag 8, the user tag 403 is a passive wireless tag which does not have its own power source.

Figure 14:
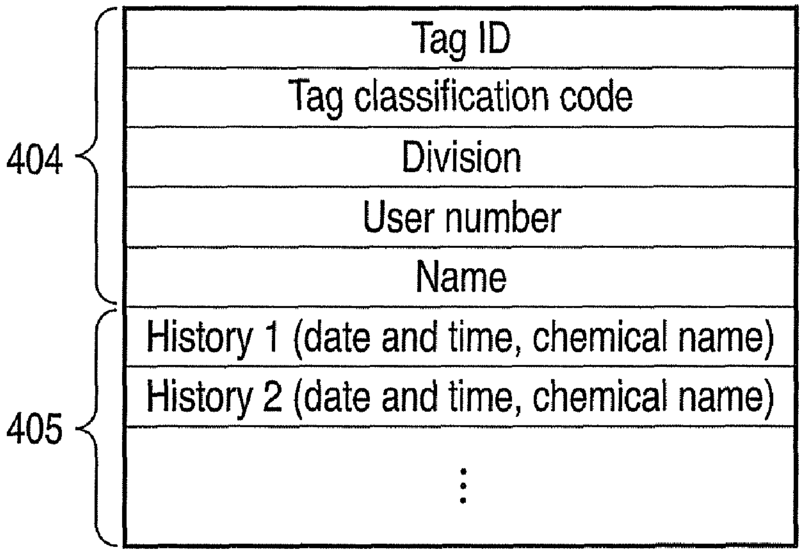
FIG. 14 is a view showing one example of data stored in a memory of a user tag used in the fourth embodiment.

One example of data stored in a memory of the user tag 403 is shown in FIG. 14. The user tag 403 stores tag data 404 and a plurality of pieces of history data 405. The tag data 404 includes item data: a tag ID, a tag classification code, a division, a user number and a name.

The tag ID is an inherent code set to be different for each of the user tags. The tag classification code is a code for identifying a wireless tag as the user tag 403. It goes without saying that the tag classification code of the user tag 403 is different from the tag classification code of the chemical tag 8. The division, the user number and the name are information concerning the user who owns the user card 402 having the user tag 403 therein. The history data includes the measurement date and time, and a chemical name.

FIG. 15 is a block diagram showing the internal configuration of the commodity management apparatus 400. As in the first embodiment, the commodity management apparatus 400 has, in an apparatus main body 11, a CPU 101, a ROM 102, a RAM 103, a clock unit 104, a communication interface 105, an operation panel controller 106, a weight detection unit 107, and a wireless tag reader/writer 108. Moreover, the commodity management apparatus 400 forms, in the RAM 103, a memory area (see FIG. 6) similar to that in the first embodiment.

In accordance with a program stored in the ROM 102, the CPU 101 executes processing of a procedure below. In this processing, the CPU 101 functions as a start control unit 111, a first stop control unit 112, a second stop control unit 113, an output control unit 114, an emptiness telling unit 115, a reweigh instruction unit 116, a determination unit 117, a report control unit 118 and a third stop control unit 119.

When a reset signal is input by the depression of, for example, a reset button provided in an input unit 14, the CPU 101 sequentially executes the processing in steps ST1 to ST14 in FIG. 7, as in the first embodiment. When a definite weight "Wh" is "0" in step ST14 (YES in ST14), the CPU 101 instructs the wireless tag reader/writer 108 to stop (the second stop control unit 113), in step ST15. Thus, the CPU 101 finishes the current processing.

On the contrary, when the definite weight "Wh" is not "0", that is, when the definite weight "Wh" is greater than "0" (NO in ST14), the CPU 101 moves to the processing shown in the flowchart in FIG. 16. That is, in step ST51, the CPU 101 determines whether a tag data counter "r" is "2".

If there are two kinds of wireless tags read by the wireless tag reader/writer 108 during the period in which the weight detection unit 107 has switched to a variation mode and then to a weight determined mode, the tag data counter "r" is "2".

When the tag data counter "r" is "2" (YES in ST51), the CPU 101 analyzes two pieces of tag data stored at an address "r−1" and an address "r" in the tag data buffer 92, in step ST52. Then, the CPU 101 determines whether the two pieces of tag data are a combination of tag data 81 in the chemical tag 8 attached to a chemical bottle 6 and tag data 404 in the user tag 403 incorporated in the user card 402.

When one chemical bottle 6 is put on a weighing dish 12, the data 81 in the chemical tag 8 attached to the side surface of this chemical bottle 6 is read by the wireless tag reader/writer 108. At this moment, if one user card 402 is put in the user card holder 401, the data 404 in the user tag 403 incorporated in this user card 402 is also read by the wireless tag reader/writer 108. Thus, if the tag data 81 in the chemical tag 8 is stored at one of the address "r−1" and the address "r" in the tag data buffer 92, the tag data 404 in the user tag 403 is stored at the other address.

In the case of a combination of the tag data 81 and the tag data 404 (YES in ST52), the CPU 101 instructs the wireless tag reader/writer 108 to stop, in step ST53 (the third stop control unit 119).

Then, in step ST54, the CPU 101 acquires an empty bottle weight "W0" from the tag data 81 in the chemical tag 8. Then, in step ST55, the CPU 101 determines whether the definite weight "Wh" stored at an address "h" in a weight data buffer 91 is equal to or less than the empty bottle weight "W0".

When the definite weight "Wh" is not equal to or less than the empty bottle weight "W0" (NO in ST55), the CPU 101 acquires a chemical name from the tag data 81 in the chemical tag 8, and displays this chemical name and the definite weight "Wh" on a display unit 15, in step ST56 (the output control unit 114).

When the definite weight "Wh" is equal to or less than the empty bottle weight "W0" (YES in ST55), the CPU 101 acquires a chemical name from the tag data 81, and displays this chemical name and the definite weight "Wh" on the display unit 15, in step ST57 (the output control unit 114). The CPU 101 also displays on the display unit 15 information to tell the user that the chemical bottle 6 is empty (the emptiness telling unit 115).

When the chemical name and the definite weight "Wh" are displayed on the display unit 15 in the processing of step ST56 or step ST57, the CPU 101 takes in the current date and time kept by the clock unit 104, in step ST58. The CPU 101 also acquires a user number from the tag data 404 in the user tag 403. Then, the CPU 101 instructs the wireless tag reader/writer 108 to write the history data including the date and time, the user number and the definite weight "Wh" to the chemical tag 8.

The wireless tag reader/writer 108 which has received the write instruction generates a command to write data to the chemical tag 8. This command includes the history data received from the CPU 101. The tag ID included in the tag data 81 in the chemical tag 8 is also added to a write destination address. The wireless tag reader/writer 108 sequentially supplies antennas 5A to 5D with carrier wave signals modulated by the data write command.

Radio waves corresponding to the carrier wave signals are emitted from the antennas 5A to 5D to which the carrier wave signals have been supplied. The UHF radio waves emitted from the antennas 5A to 5D reach a region above the weighing dish 12.

Thus, if the chemical bottle 6 is mounted on the weighing dish 12, the chemical tag 8 attached to the side surface of the chemical bottle 6 reliably receives the radio waves from at least one of the antennas 5A to 5D.

Receiving the radio waves, the chemical tag 8 demodulates the radio waves and thus comprehends the command. When the command is a data write command, the chemical tag 8 determines whether the tag ID contained in this command is its own tag ID. When the tag ID is the tag ID of the chemical tag 8, write data, that is, the history data including the date and time and the definite weight "Wh" is written to the memory.

When the writing of the history data to the chemical tag 8 is finished, the CPU 101 acquires a chemical name from the tag data in the chemical tag 8, in step ST59. Then, the CPU 101 instructs the wireless tag reader/writer 108 to write, to the user tag 403, the history data including the chemical name and the data on the current date and time acquired from the clock unit 104. Thus, the CPU 101 finishes the current control.

The wireless tag reader/writer 108 which has received the write instruction generates a command to write data to the user tag 403. This command includes the history data received from the CPU 101. The tag ID included in the tag data 404 in the user tag 403 is also added to a write destination address. The wireless tag reader/writer 108 sequentially supplies the antennas 5A to 5D with carrier wave signals modulated by the data write command.

Radio waves corresponding to the carrier wave signals are emitted from the antennas 5A to 5D to which the carrier wave signals have been supplied. The UHF radio waves emitted from the antennas 5A to 5D reach the region above the weighing dish 12.

Thus, if the user card 402 is put in the user card holder 401, the user tag 403 incorporated in this user card 402 reliably receives the radio waves from at least one of the antennas 5A to 5D.

Receiving the radio waves, the user tag 403 demodulates the radio waves and thus comprehends the command. When the command is a data write command, the user tag 403 determines whether the tag ID contained in this command is its own tag ID. When the tag ID is the tag ID of the user tag 403, write data, that is, the history data including the date and time and the chemical name is written to the memory.

When the tag data counter "r" is not "2" in step ST51, the CPU 101 displays on the display unit 15 a message to report a tag read error to the user. Thus, the CPU 101 finishes the current processing.

Similarly, when the two pieces of tag data are not a combination of the tag data 81 and the tag data 404 in step ST52, the CPU 101 also displays on the display unit 15 a message to report a tag read error to the user. Thus, the CPU 101 finishes the current processing.

In the fourth embodiment, the commodity management apparatus 400 properly processes the weight data for the chemical bottle 6 and the data for the chemical tag 8 only when the user card 402 is put in the user card holder 401. This ensures that the user who uses the commodity management apparatus 400 to manage the amount of a chemical can be identified.

Figure 12:
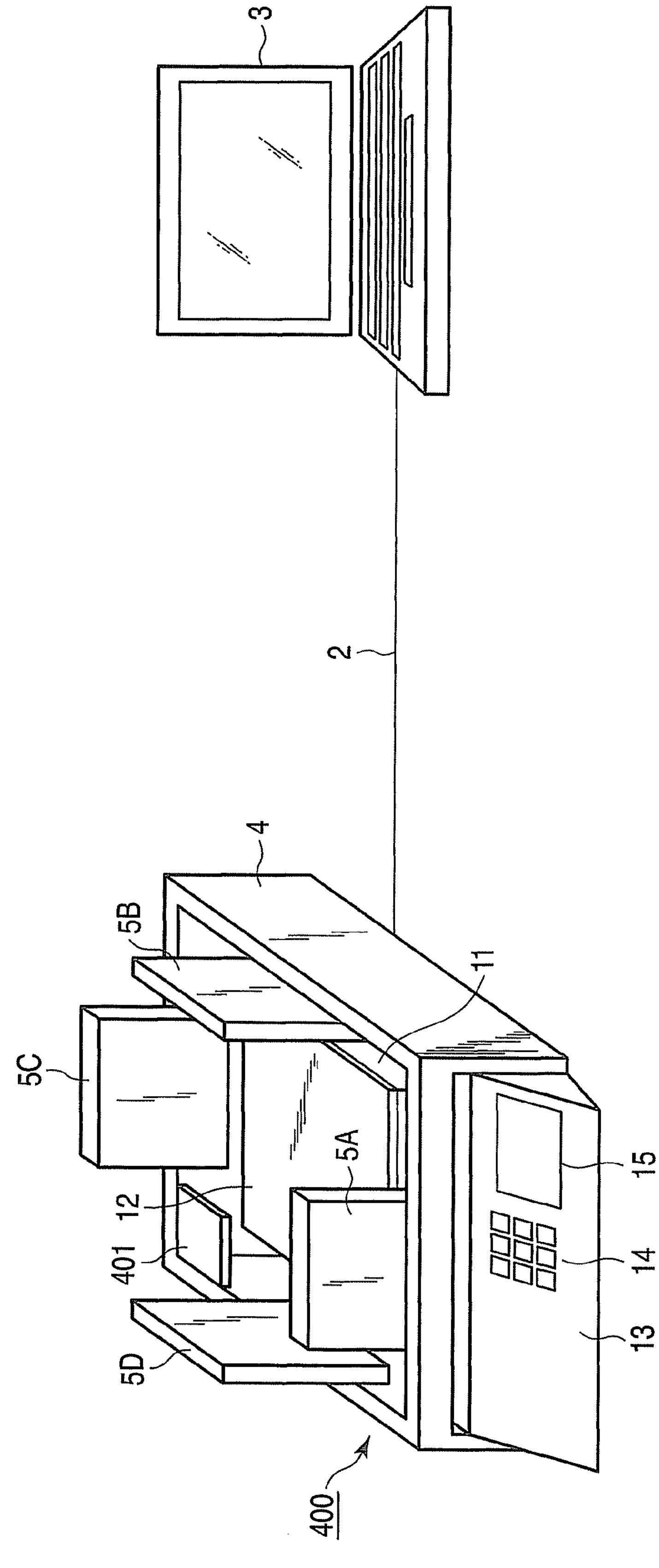
FIG. 12 is a perspective view showing the external configuration of a commodity management apparatus in a fourth embodiment of the present invention.

In addition, in the fourth embodiment, the position of the user card holder 401 is not limited to the position shown in FIG. 12. In short, the user card holder 401 has only to be positioned so that the data in the user tag 403 can be read by the antennas 5A to 5D. Moreover, in the fourth embodiment, the antennas may serve as leaky transmission paths as in the third embodiment.

Moreover, the present invention is not exclusively limited the embodiments described above, and modifications can be made to the components without departing from the spirit thereof at the stage of carrying out the invention. For example, the commodity to be managed is not limited to a chemical. The container is not limited to the form of a bottle either.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A commodity management apparatus comprising:

a weighing dish on which a container having a wireless tag attached thereto is mounted;

an antenna that forms a region to communicate with the wireless tag from a side part of the weighing dish to an upper part of the weighing dish;

a tag reader that contactlessly reads, via the antenna, data in the wireless tag attached to the container;

a weight detection unit that detects a weight of the container mounted on the weighing dish;

an output control unit that outputs the weight of the container detected by the weight detection unit and the data in the wireless tag read by the tag reader; and a stop control unit which stops the tag reader to stop output of electromagnetic waves from the antenna in response to the tag reader simultaneously reading the data in the wireless tag attached to the container and data in a wireless tag to identify a user.

2. The commodity management apparatus according to claim 1, further comprising:

an antenna attachment member disposed at a given distance from a peripheral edge of the weighing dish, wherein the antenna is a planar antenna, and the antenna attachment member fixes a plurality of planar antennas so that surfaces of the plurality of plantar antennas are in different directions.

3. The commodity management apparatus according to claim 1, further comprising:

an antenna attachment member disposed along an outer periphery of the weighing dish, wherein the antenna is a leaky transmission path, and the antenna attachment member fixes the leaky transmission path along the outer periphery of the weighing dish.

4. The commodity management apparatus according to claim 1, further comprising:

an apparatus main body provided with the weighing dish, wherein the tag reader is incorporated in the apparatus main body.

5. The commodity management apparatus according to claim 4, further comprising:

an antenna attachment member disposed outside the apparatus main body at a given distance from a peripheral edge of the weighing dish, wherein the antenna is a planar antenna, and the antenna attachment member fixes a plurality of planar antennas so that surfaces of the plurality of planar antennas are in different directions.

6. The commodity management apparatus according to claim 4, further comprising:

an antenna attachment member disposed outside the apparatus main body along an outer periphery of the weighing dish, wherein the antenna is a leaky transmission path, and the antenna attachment member fixes the leaky transmission path along the outer periphery of the weighing dish.

7. The commodity management apparatus according to claim 1, further comprising:

an apparatus main body provided with the weighing dish, wherein the tag reader is provided outside the apparatus main body.

8. The commodity management apparatus according to claim 7, further comprising:

an antenna attachment member disposed outside the apparatus main body at a given distance from a peripheral edge of the weighing dish, wherein the antenna is a planar antenna, and the antenna attachment member fixes a plurality of planar antennas so that surfaces of the plurality of planar antennas are in different directions.

9. The commodity management apparatus according to claim 7, further comprising:

an antenna attachment member disposed outside the apparatus main body along an outer periphery of the weighing dish, wherein the antenna is a leaky transmission path, and the antenna attachment member fixes the leaky transmission path along the outer periphery of the weighing dish.

10. The commodity management apparatus according to claim 1, further comprising:

a start control unit that starts the tag reader to output electromagnetic waves from the antenna in response to a detection amount in the weight detection unit varying and the weight detection unit being in a variation mode.

11. The commodity management apparatus according to claim 1, further comprising:

a first stop control unit that stops the tag reader to stop the output of electromagnetic waves from the antenna in response to a detection amount in the weight detection unit stabilizing and the weight detection unit being in a determined mode accordingly.

12. The commodity management apparatus according to claim 1, further comprising:

a second stop control unit that stops the tag reader to stop the output of electromagnetic waves from the antenna in response to a detection amount in the weight detection unit reaching zero.

13. The commodity management apparatus according to claim 11, further comprising:

a second stop control unit that stops the tag reader to stop the output of electromagnetic waves from the antenna in response to a detection amount in the weight detection unit reaching zero.

14. The commodity management apparatus according to claim 1, further comprising:

a reweigh instruction unit that generates a reweigh instruction to reweigh the container in response to a determination that the data in the wireless tag has not been read after a predetermined period has passed since a start of the tag reader.

15. The commodity management apparatus according to claim 14, further comprising:

a determination unit that determines whether a first weight detection amount in the weight detection unit corresponding to a weight of the container prior to reweigh coincides or substantially coincides with a second weight detection amount corresponding to a weight of the container after reweigh; and a report control unit that reports that reweighing is improper in response to a determination by the determination unit that the first weight detection amount and the second weight detection amount do not coincide or substantially coincide.

16. The commodity management apparatus according to claim 1, wherein the data in the wireless tag attached to the container includes a weight of the container while empty.

17. The commodity management apparatus according to claim 16, further comprising:

an emptiness telling unit that determines that the container is empty in response to the weight detected by the weight detection unit being coincident with the weight of the container while empty included in the data in the wireless tag read by the tag reader.

* * * * *